March 17, 1964 R. C. PRATT 3,125,478
METHOD OF MAKING PLASTIC TUBULAR MEMBERS OF
RESIN REINFORCED SHEET MATERIAL
Filed Oct. 16, 1959 2 Sheets-Sheet 1

ROBERT C. PRATT
INVENTOR.

BY
*Pattison, Wright & Pattison*

ATTORNEYS

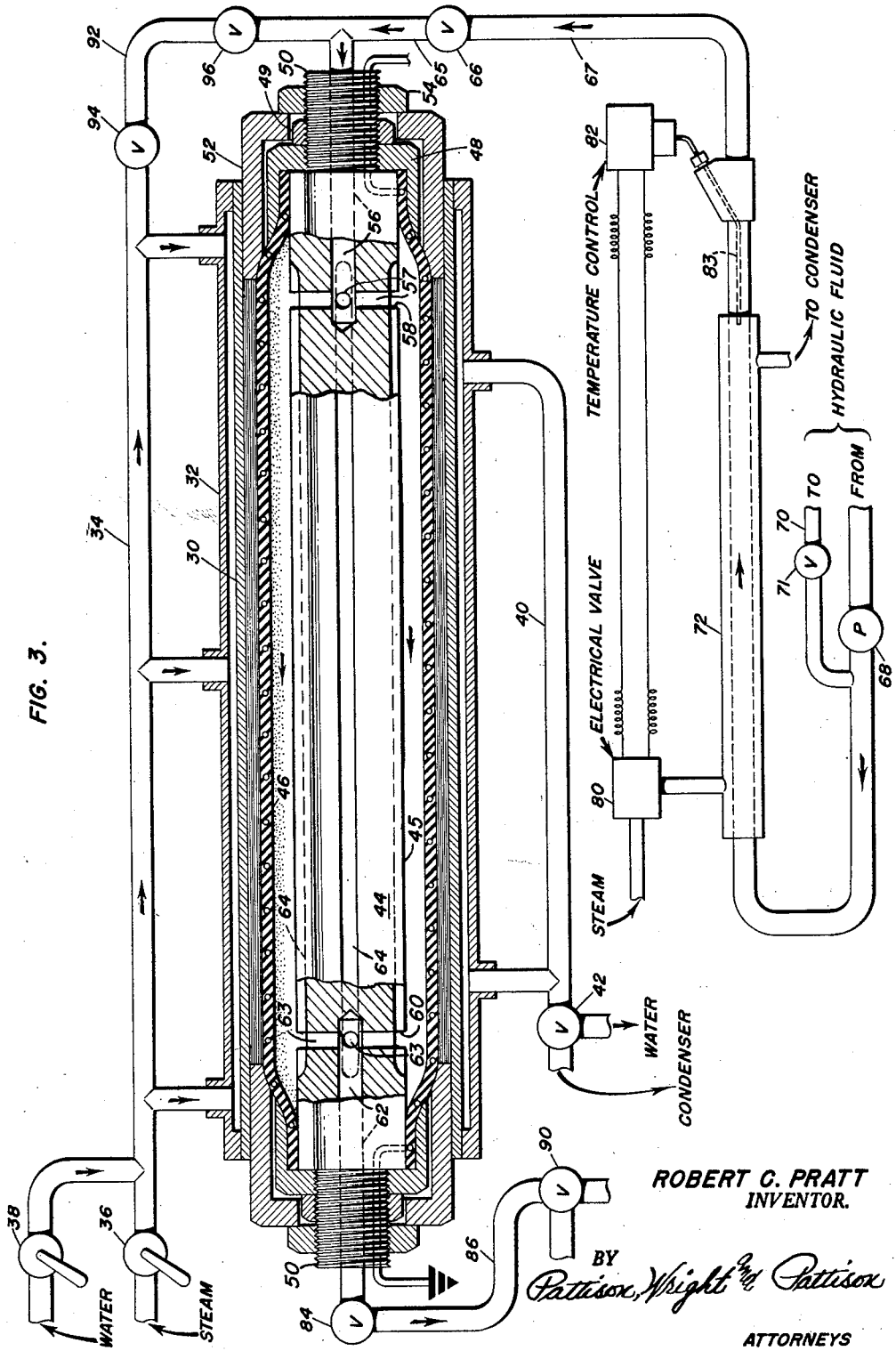

3,125,478
METHOD OF MAKING PLASTIC TUBULAR MEMBERS OF RESIN REINFORCED SHEET MATERIAL
Robert C. Pratt, Scituate, Mass., assignor to Babbitt Pipe Company, Inc., Plymouth, Mass.
Filed Oct. 16, 1959, Ser. No. 846,878
10 Claims. (Cl. 156—184)

The present invention relates to plastic tubular members, and the method of and apparatus for manufacturing the same.

The invention contemplates the use of reinforcing sheet material and thermo-setting resins, wherein the entire mass is amalgamated together into a strong rigid structure. The use of fibrous materials is commonplace but it has been found that when sheet material is used, and the member is manufactured by winding a preform and then expanding the preform outwardly, difficulty is encountered because of the necessity of permitting the laminates to slip on one another, thus restricting the expansion to the inherent stretchability of the material.

In accordance with the invention herein, the sheet material is mechanically or otherwise shortened, whereby it may again be stretched to approximately its original length. It is also desirable that the tubular structures be made in lengths of 20, 30 and 40 feet, and this must be done at a rapid rate of speed in order that the tubular members may be economically produced. The possibility of having sheet material which may be cut to form the required lengths, and which will have a uniform stretch throughout is remote, whereas this may be accomplished by providing a controlled stretch.

The object of this invention is to make tubular plastic members which have satisfactory time, pressure and temperature characteristics for the end use desired, by producing them under controlled expansion, and by a process which will prevent the formation of voids assuring substantial non-porosity, although rapid manufacture of the tubular members is accomplished.

A further object is to produce plastic tubular members which have greatly increased strength.

These and other objects will become apparent from the description herein when read in view of the accompanying drawings, wherein:

FIGURE 3 is a cross sectional view of the apparatus used for carrying out the process herein.

Figure 1:
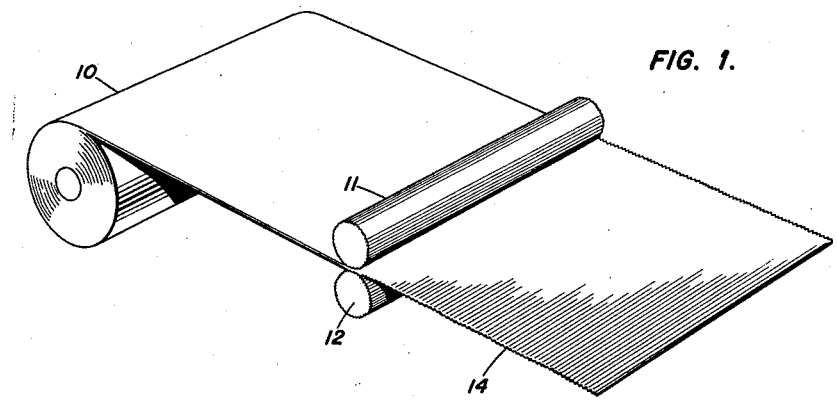
FIGURE 1 is a schematic view showing the treatment of the paper in order to provide a controlled stretch characteristic.

Generally the tubular structure members are made by spirally wrapping strips of resin treated material into a tubular preform, placing the preform on an expandible mandrel within a die and then expanding the mandrel while applying heat and pressure in order to cure the resin. The reinforced sheet material utilized in the making of the preform must have a stretch characteristic because the thickness of the preform runs as high as 40% greater than the final thickness of the tubular member. Because of this it is apparent that the innermost ply must be substantially increased in circumference with each outer ply having a lesser increase in circumference. Heretofore fibrous materials having an inherent stretch have been extensively utilized, but it has been found that utilization of such materials requires special treatment, and when wood fibres are used, special compositions. Herein the fibrous sheet material is treated to provide a controlled stretch, and this can be done, in any suitable way, such as illustrated in FIG. 1, wherein a roll of fibrous sheet material 10, herein being paper is drawn between crinkling rollers 11 and 12 which are rotating at different speeds. As the paper leaves the crinkling rollers it has been shortened to the degree desired and the controlled stretch provided, that is, if it has been shortened 10% it may be stretched 10% without placing the sheet under strain. Following the crinkling of the paper, it is cut into strips 18 (see FIG. 2) for winding into preforms. Crinkling as used is not meant to include only shortening by such mechanical means, for example substantial shortening may be accomplished by crushing, as is evidenced by taking a new one dollar bill and rolling it into a ball. In addition to shortening the paper lengthwise it may also be transversely shortened, thus providing a double stretch for reasons hereinafter explained; such lengthwise and transverse shortening may be accomplished by crushing, as explained above.

Figure 2:
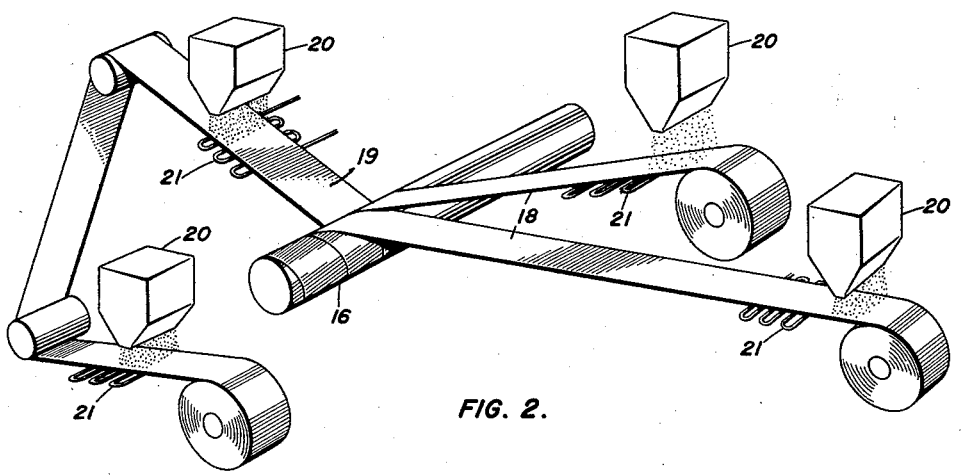
FIGURE 2 is a schematic view showing the resin treatment of the shortened paper and the winding of it into a preform.

One of the advantages of utilizing the stretchable paper is that the treatment heretofore followed of impregnating the sheet with phenolic resin by drawing it thru a bath of A stage phenolic and then curing it to the B stage may be eliminated, and the cost reduced accordingly. As shown in FIG. 2 as the strips 18 are drawn onto a mandrel to wind the preform, resin is deposited directly thereon from shakers 20. Inasmuch as each successive ply will overlie the next one the resin will be held in position until the curing is accomplished.

If, however, the preform is subject to extensive handling, or it must be coated on both sides, as indicated at 19 in FIG. 2, the strips may be heated by suitable heating elements 21 to cause the resin to soften sufficiently to adhere thereto. During the winding of the preform the plies may be stretched so as to elongate the paper, while leaving the degree of stretch therein as required for expansion during the molding operation. In this way, the preform may be fabricated without straining the fibrous material, and, moreover by not stretching the sheet to its full length, it presents a greater surface area per square inch, thus presenting a greater bonding area. Thus, during the forming of the preform, accurate control can be had, if the innermost ply must be expanded 10% and this is the limit of stretch of the paper, it will be stretched without being placed under tension. Obviously each outer ply will require less stretch when expanded so that part of the stretch may be taken out during winding. The final tubular member will thus be one wherein there is equalized tension throughout.

The reduction of the preform into a final tubular member is accomplished in the apparatus illustrated in FIG. 3, which will be initially described in order that the forming steps may be more readily followed. As therein shown, there is provided a cylindrical metal die 30 provided with a jacket 32 for the passage of fluid around the die. The jacket 32 is connected by inlet passages 34 through a control valve 36 to a source of steam or through a control valve 38 to a source of water. Diametrically opposite the inlet passages the jacket is provided with an outlet passage 40 connected through a two way control valve 42 to an outlet leading to a condenser or to the water supply. Positioned within the die is a mandrel 44, having a central cylindrical metal core 45, of substantially the same length as the die 30, and reduced threaded end portions 50, which extend beyond the die. Overlying the central core 45 is an expansible sleeve 46, each end of which is secured to the central core 45 by a cylindrical cup-shaped member 48, screw threaded onto the end portions 50 and secured by a lock nut 49. The mandrel 44 is positioned within the die by cylindrical cup-shaped members 52 which are held in position by nuts 54 threadedly mounted on the mandrel reduced end portions 50.

The mandrel 44 is provided with an inlet passage 56 which runs through the center to a position beyond the adjacent secured end of the sleeve 46, wherein radial passages 57 are provided which terminate at a circumferential groove 58 cut into the face of the mandrel core 45. The opposite end of the core is provided with a similar circumferential groove 60 from which radial passages 63 lead to an outlet passage 62. Additional circumferential grooves are spaced along the core and all are interconnected by the longitudinally extending grooves 64 for reasons hereinafter explained. The inlet passage 56 of the core is connected to a hydraulic fluid passage 65 connecting through a control valve 66 to a hydraulic fluid passage 67 into which hydraulic fluid under pressure is forced by a pump 68. A bypass 70 is provided around the pump, with a suitable release valve 71, in order to recirculate the hydraulic fluid back to its source if the pressure rises above that which is desired. The hydraulic fluid passage 67, intermediate the control valve 66 and pump 68, is surrounded by a suitable jacket 72 connected through a valve 80 to a source of steam, in order to heat the hydraulic fluid. The temperature of the hydraulic fluid is controlled through valve 80 which is electrically responsive to any suitable type of temperature control means 82 having a suitable temperature responsive element 83 located within the passage 67.

As is apparent, when the control valve 66 is open the hydraulic fluid will enter the mandrel and pass therethrough, and to control the pressure within the mandrel there is provided at the outlet end of outlet passage 62 a bleeder valve 84. This valve also connects to a passage 86 which terminates in a two way valve 90 for directing the hydraulic fluid or water to their proper sources.

In carrying out the process the preform is initially placed over the mandrel, and the mandrel with the preform thereon is placed in the die, as shown in FIG. 3, wherein the mandrel sleeve is shown in expanded position. The mandrel sleeve normally fits close to the mandrel core, and the preform substantially fills the space between the sleeve and the inner wall of the die 30. Thereafter the collar members 52 are inserted until they abut against the ends of the preform and are locked in position.

With the preform so positioned the hydraulic fluid valve 66 is opened permitting fluid to flow into the mandrel. The fluid will initially flow into the circumferential groove 58 along the longitudinal grooves 64 into the circumferential groove 60 and then through the outlet passage 62. During this time the bleeder valve 84 is wide open and obviously the circulation of the fluid through the mandrel will force out any air within the grooves and also heat the sleeve. Thereafter the bleeder valve 84 is closed sufficiently to build up a pressure within the mandrel behind the sleeve 46.

With the fluid circulating through the mandrel and through the grooves therein it is apparent that there will be simultaneous expansion of the entire sleeve 46 and the latter will compress the preform plies together, and as the preform is made with stretchable paper the increase of pressure may be accomplished rapidly, in fact as close to instantaneously as possible. The pressure utilized is that which will cause maximum compressibility toward final wall thickness, the range being from 900 to 1500 lbs. per square inch. This high pressure also drives the resin into the wood fibre and a consolidation of the mass is accomplished.

When so compressed the resin is brought into intimate contact and rapid heat transfer occurs. More important, however, is the fact that under such pressure, moisture within the preform will not reach a temperature where it will flash off into steam but is retained as minute droplets dispersed through the entire preform. By preventing such flashing off, voids will not be formed and the resulting tubular member will be, for all practical uses, nonporous.

Simultaneously with the application of pressure heating fluid is passed around the die, and, as the hydraulic fluid is also heated, rapid curing is accomplished. The temperature should be raised to approximately 320° F., and the time required will be approximately one minute per ply plus five minutes.

Following the curing it is essential in order to obtain rapid manufacture and also to prevent the formulation of voids, that the finished tubular member be rapidly cooled. To accomplish this, cold water valve 38 is opened and cooling water is fed to the jacket 32 surrounding the die, the steam control valve 36 meanwhile having been closed. If desired, cooling water may also be fed through the mandrel through bypass 92 and valves 94 and 96. During the cooling the pressure on the sleeve is gradually diminished but the pressure retained is sufficient during the cooling period to assure that water droplets will not flash into steam.

A distinct advantage in using shortened stretchable paper is the fact that substantially more fibrous material per unit length is obtained than when the paper is not shortened, thus increasing the hoop tensile strength particularly as the thickness of the wall is increased. A four inch outside diameter tubular member having a quarter inch wall thickness shows an increase in hoop tensile strength of 30%.

Although the description herein has been directed to the use of paper, that is wood fibers, it is apparent that other fibrous material could be used, such as sheet asbestos, which could be shortened by minute pleating. Preferably the sheet should have sufficient body to avoid the use of special means to prevent sagging as the preforms are being wound, and a sheet having a 10 mill thickness is preferred.

As previously mentioned, the material may be both longitudinally and transversely shortened. The width of each ply is reduced but more fibres are crowded into the same width giving increased axial strength, and it also assists in keeping the abutting edges of the spiral preform firmly against one another as it is wound as shown in FIG. 2.

The invention having been defined, the following is claimed:

1. The process of manufacturing plastic tubular members which comprises, crinkling a sheet of fibrous material to shorten it, treating the material with resin, spirally winding the resin treated material into a tubular preform, placing a tubular restraining member around the exterior of the preform, applying an outwardly acting fluid pressure internally of the preform to compress the plies together and expand them circumferentially to remove the crinkling and lengthen the material approximately the amount it was shortened, while simultaneously heating the preform to cure the resin.

2. The process according to claim 1 wherein the pressure is approximately one thousand p.s.i. and the preform is heated to approximately 320° F.

3. The process of manufacturing plastic tubular members which comprises crinkling a fibrous material to shorten it, treating the material with resin, spirally winding a preform of the resin treated material, placing a restraining member around the preform, applying an outwardly acting fluid pressure internally of the preform to compress the material together and expand it circumferentially to reduce the crinkling while simultaneously applying heat to the preform, both internally and externally, to cure the resin.

4. The process of manufacturing plastic tubular members which comprises spirally winding resin coated crinkled fibrous material capable of expansion, into a tubular preform, placing a restraining member around the preform, applying an outwardly acting fluid pressure internally of the preform to compress the fibrous material together and expand it circumferentially, and simultaneously applying heat to the preform to cure the resin.

5. The process of manufacturing plastic tubular members which comprises crinkling fibrous strips to shorten them and provide stretchability, coating the srips with resin, spirally winding a plurality of the strips into a preform having a wall thickness greater than that required in the final tubular member, placing a restraining member around the preform, applying an outwardly acting pressure internally of the preform to expand the strips circumferentially and compress the strips outwardly to final wall thickness and simultaneously applying heat to the preform to cure the resin.

6. The process of manufacturing plastic tubular members which comprises mechanically shortening strips of fibrous sheet material to provide stretchability therein, treating the strips with resin, spirally winding the strips into a preform, placing a restraining member around the preform, inserting an expansible member inside the preform, circulating a heated fluid through the expansible member, restricting the flow of the fluid from the expansible member to establish an outwardly acting internal pressure to expand the expansible member and the preform by stretching and compressing the strips together, the heated fluid simultaneously heating the expansible member to cure the resin.

7. The method of making tubular members which comprises mechanically shortening strips of fibrous material to provide stretchability therein, spirally winding the strips into a preform while applying resin to the surface thereof, exerting an outwardly acting fluid pressure internally of the preform to stretch the strips circumferentially while compressing them into maximum compressibility, and while compressed applying heat to the preform to cure the resin.

8. The process set forth in claim 7 where the pressure is approximately 1,000 p.s.i. and the temperature of the applied heat is approximately 320° F.

9. The process of making a tubular member which comprises crinkling a sheet of fibrous material to shorten it, treating the sheet with resin, winding the sheet into a tubular preform having a plurality of plies, each ply being wound to have a circumference smaller than it will have in the finished tubular member, applying pressure internally of the preform to expand the plies circumferentially to the circumference of the finished member and applying heat to the preform to cure the resin.

10. The process of making a tubular plastic member which comprises crinkling a sheet of fibrous material to shorten it, treating the sheet with resin, winding the sheet into a tubular preform having a plurality of plies, with each successive ply having a circumference of lesser size than the circumference required in the finished member by approximately the amount the material has been shortened, applying an outwardly acting pressure internally of the preform to expand the plies circumferentially to remove the crinkling and increase the circumference of the plies to finished tubular member size.

References Cited in the file of this patent

UNITED STATES PATENTS

| | | |
|---|---|---|
| 1,165,644 | Wood | Dec. 28, 1915 |
| 1,282,167 | Angier | Oct. 22, 1918 |
| 2,343,930 | Rowe | Mar. 14, 1944 |
| 2,390,171 | Ratay | Dec. 4, 1945 |
| 2,411,542 | Ilch | Nov. 26, 1946 |
| 2,552,599 | Stout | May 15, 1951 |
| 2,594,838 | Alexander et al. | Apr. 29, 1952 |
| 2,614,058 | Francis | Oct. 14, 1952 |
| 2,669,258 | Spitz | Feb. 16, 1954 |
| 2,723,426 | Pelley | Nov. 15, 1955 |
| 2,737,998 | Meanor et al. | Mar. 13, 1956 |
| 2,768,920 | Stout | Oct. 30, 1956 |
| 2,783,174 | Stephens | Feb. 26, 1957 |
| 2,892,749 | Carpenter | June 30, 1959 |